United States Patent [19]

Snyder

[11] 4,178,498

[45] Dec. 11, 1979

[54] ELECTRIC TOASTER CONTROL

[75] Inventor: Paul V. Snyder, Whitehall, Pa.

[73] Assignee: General Electric Company, New York, N.Y.

[21] Appl. No.: 848,884

[22] Filed: Nov. 7, 1977

[51] Int. Cl.² .................... F27D 11/02; A21B 3/02
[52] U.S. Cl. ............................ 219/413; 99/327; 200/17 R; 219/414; 337/1; 337/3
[58] Field of Search ............... 219/391, 412, 413, 414; 99/327, 332, 335; 335/1, 2; 337/1, 3; 200/238, 239, 247–251, 17 R, 17 A

[56] References Cited

U.S. PATENT DOCUMENTS

| | | | |
|---|---|---|---|
| 457,483 | 8/1891 | Silvey | 335/171 |
| 2,293,741 | 8/1942 | Lucia | 99/327 |
| 2,414,325 | 1/1947 | Newell | 99/327 |
| 2,525,846 | 10/1950 | Wilson | 74/532 |
| 2,545,288 | 3/1951 | Kuhn et al. | 99/327 |
| 2,631,523 | 3/1953 | Olving | 99/326 |
| 2,804,522 | 8/1957 | Dehmlow | 200/106 |
| 3,242,294 | 3/1966 | Kauffman | 337/1 |
| 3,410,988 | 11/1968 | Nagel | 219/412 |
| 3,529,534 | 9/1970 | Snyder | 337/3 |
| 3,684,861 | 8/1972 | Deremer | 219/413 |
| 3,752,955 | 8/1973 | Grove | 219/413 |

Primary Examiner—Bruce A. Reynolds
Assistant Examiner—Bernard Roskoski
Attorney, Agent, or Firm—Leonard J. Platt; George R. Powers; John F. Cullen

[57] ABSTRACT

An electric oven toaster construction wherein a unique inverted L-shaped lever is provided for controlling operation of an oven toaster switch and a toaster timer. The lever is pivotally mounted at the intersection of its legs and a generally horizontal leg extends outwardly from the oven toaster to a position where it may be manually actuated. The other leg extends downwardly for moving the toaster timer to its on position. The generally horizontal leg of the lever includes a downwardly extending latch arm which is movable into engagement with a solenoid armature for holding the lever and the switch in a closed position during a toasting cycle. Thus, at the end of a toasting cycle, the toaster timer actuates the solenoid to release the latch arm and a spring bias of the switch moves the switch and the inverted L-shaped lever to an open position.

6 Claims, 7 Drawing Figures

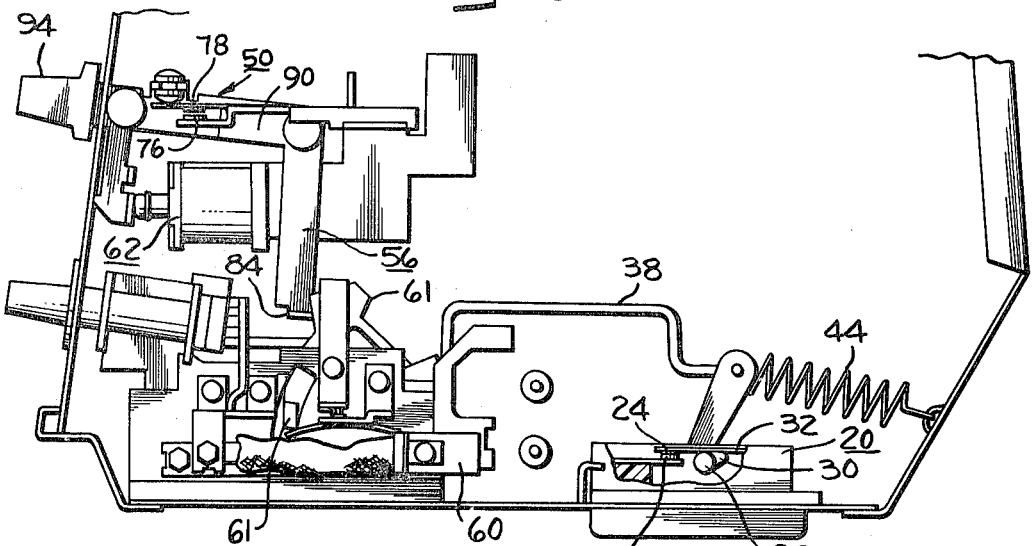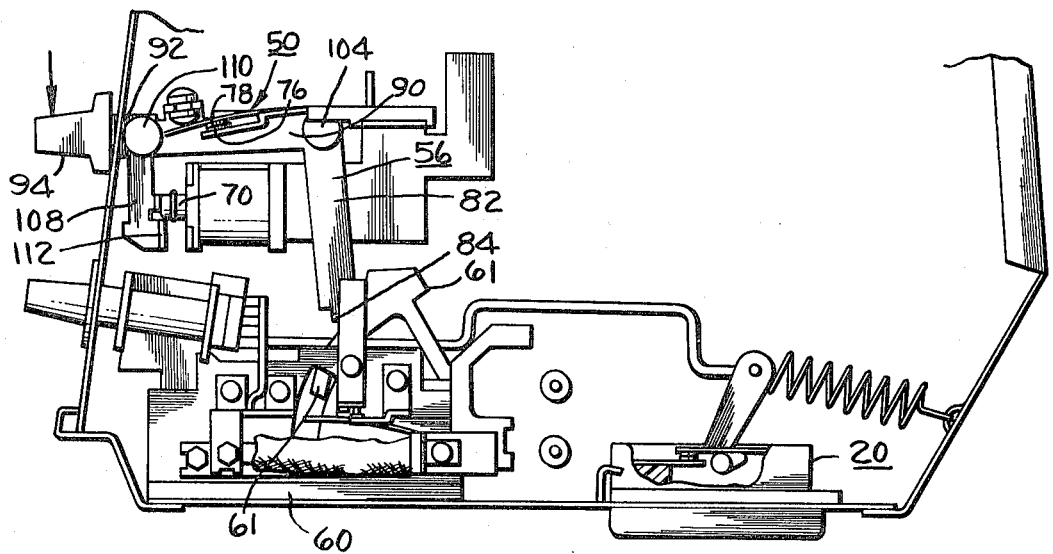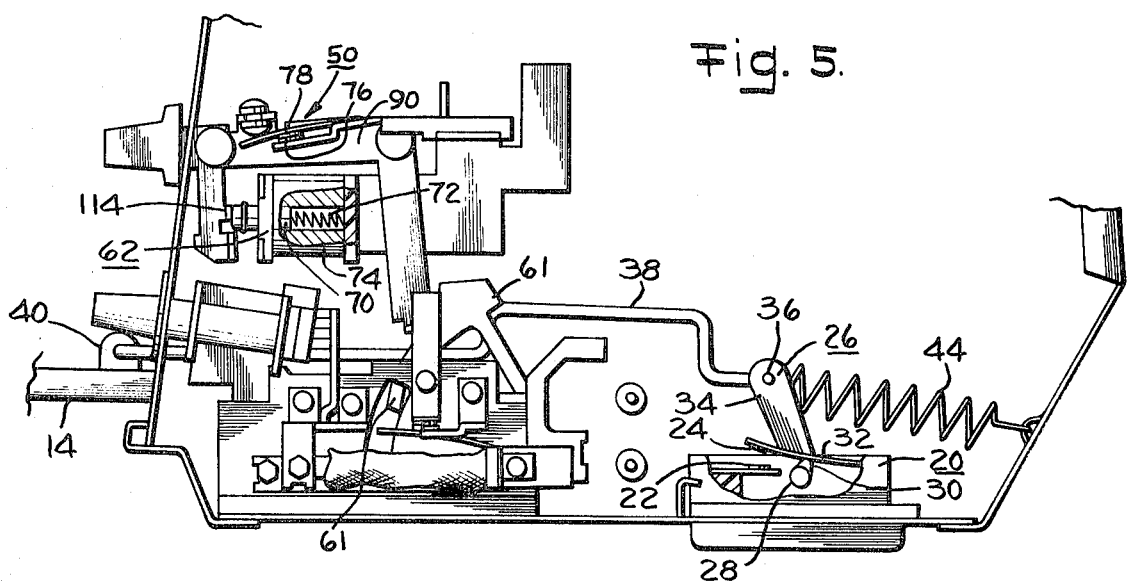

ELECTRIC TOASTER CONTROL

BACKGROUND OF THE INVENTION

1. Field of the Invention

This invention relates to an electric oven toaster and more particularly to a simplified control mechanism for such an oven toaster.

2. Description of the Prior Art

In a prior U.S. Pat. No. 3,684,861 to Harold A. DeRemer, assigned to the same assignee as the present invention, there is disclosed an arrangement for controlling operation of an oven toaster. A main switch 40 is provided for controlling energization of heating elements 22, 23, 24 and 25, and a heat-up/cool-down bi-metal toaster timer 82 is provided for actuating a solenoid 132 at the end of a toast cycle to operate the latching mechanism in order to open the main switch to deenergize the electric heating elements. As shown more particularly in FIG. 3 of the patent, a manually operable push-button lever 60-154 may be moved downwardly from an off position illustrated in FIG. 3, to a toast position illustrated in FIG. 4, in order to move the main switch 40 to its closed position. During this movement, a cam 162 is rotated in a clockwise direction about its pivot 164 by a drive pin 160 which is fixed to and moves downwardly with the push-button lever 60-154. Rotation of the cam 162 forces a detent lug 166 out of an off notch 169 against the force of a spring 314 to position the detent lug on a raised toast cam surface 167 of the rotatable cam 162. This results in a downward motion of lever 71-73 to cause a downward movement of the pivot 75 for lever 72-78. Downward movement of the pivot 75 closes the switch contact 48-51 to energize the heating elements to toast a slice of bread.

Downward movement of the lever 154 also starts a toast timer. Downward movement of lever 154 moves its lug 152 into a latch slot 150 of lever 146 to pivot the lever 146 in a counterclockwise direction about pivot pin 148. Counterclockwise movement of lever 146 causes a generally rearward movement of lugs 144 and 206 which are attached to the lower portion of lever 146. Lug 144 cooperates with a latch notch 142 which is formed in a solenoid lever 88-140, and rearward movement of the lug 144 on the lower surface of lever 140 allows the lug 144 to slide rearwardly until it is positioned within the notch 142. At that time, further rearward movement is restricted by the rear surface of the notch.

During this rearward movement of the lug 144 on the lower surface of lever 140 a solenoid spring urges the solenoid lever 88-140 in a counterclockwise direction about its pivot 344. Thus, when the pin 144 reaches the notch 142, the entire solenoid lever 88-140 will have been pivoted in a counterclockwise direction against the solenoid spring to move the lug 144 into notch 142. Accordingly, as shown in FIG. 4, the latch notch 142 holds the latch lever 146 which in turn holds the lug pin 152 of lever 320 to hold the primary manual setting lever 154 in its downward post position against the force of a solenoid spring and spring 158 during the entire toasting cycle.

In the co-pending application of Robert E. Keim, Ser. No. 752,629, filed Dec. 20, 1976 now U.S. Pat. No. 4,065,658 and assigned to the same assignee as the present invention, the latch lever 90 and other parts of the oven toaster have been modified in order to permit the manual push-button lever 60-154 to be moved upwardly to open the main switch contacts while the door is in its closed position, but is nevertheless correlated to the door so that the main switch is also open when the door is open.

My invention is concerned with such oven toaster control mechanisms, and more particularly, to an improved simplified control mechanism wherein a single, manually operable lever is positioned between a toaster switch and a toast timer for controlling operation of the oven toaster.

SUMMARY OF THE INVENTION

Accordingly, it is a particular object of my invention to provide an improved, simplified control mechanism for an electric oven toaster having relatively few parts which may be readily manufactured and assembled to each other.

It is a still further object of this invention to provide a convenient and readily operated manual control which may be moved to an off position or an on position without opening an oven toaster door.

In accordance with one of the aspects of this invention, an electric oven toaster includes electric heating means for supplying heat to a toasting chamber, a toast switch for energizing and de-energizing the electric heating means and a toasting period controller for opening the toast switch at the end of a toasting cycle. A single, manually operable lever is positioned between the toast switch and the toasting period controller for manually closing the toast switch and starting the operation of the toasting period controller. The toast switch is spring biased to an open position, and the single, manually operable lever includes a latch arm which is movable into engagement with the toasting period controller for holding the single lever and the toast switch in a closed position against the spring bias of the toast switch. The toast period controller includes a means that is actuated at the end of a toasting cycle to release the latch arm of the single manually operable lever. Thus, at the end of a toasting cycle, the toasting period controller releases the latch arm of the single, manually operable lever and the spring bias of the toast switch moves the switch and the manually operable lever to an open position.

Accordingly, with my improved construction arrangement, relatively few parts are required for controlling operation of an oven toaster. A single, manually operable lever is positioned between an oven toaster start switch and an oven toaster timer or controller. One leg of the lever starts the operation of the toaster timer. Another leg of the lever extends outwardly from the oven toaster to a position where it may be manually operated and a latch arm of the lever may directly engage a solenoid armature of the toast timer. Thus, an exceedingly simple reliable oven toaster control has been achieved.

Moreover, with this unique construction, relatively slight upward force on the manually operable lever will release the latch arm from the solenoid armature. Thus, the manually operated control lever may be moved to an off position without opening a toaster oven door.

BRIEF DESCRIPTION OF THE DRAWING

Other objects and attendant advantages of the invention will be apparent from the following description taken in connection with the accompanying drawing in which:

FIG. 3 is a fragmentary side elevational view similar to FIG. 2 showing the off position of the parts after the door has been closed but before commencement of a toasting cycle;

FIG. 4 is a fragmentary side elevational view similar to FIG. 2 showing the positions of the parts at the commencement of a toasting cycle;

FIG. 5 is a side elevational view similar to FIG. 2 showing the positions of the parts after the door has been opened to temporarily interrupt the toasting cycle to add another slice of bread to the oven toaster, for example;

DESCRIPTION OF THE PREFERRED EMBODIMENT

Figure 1:
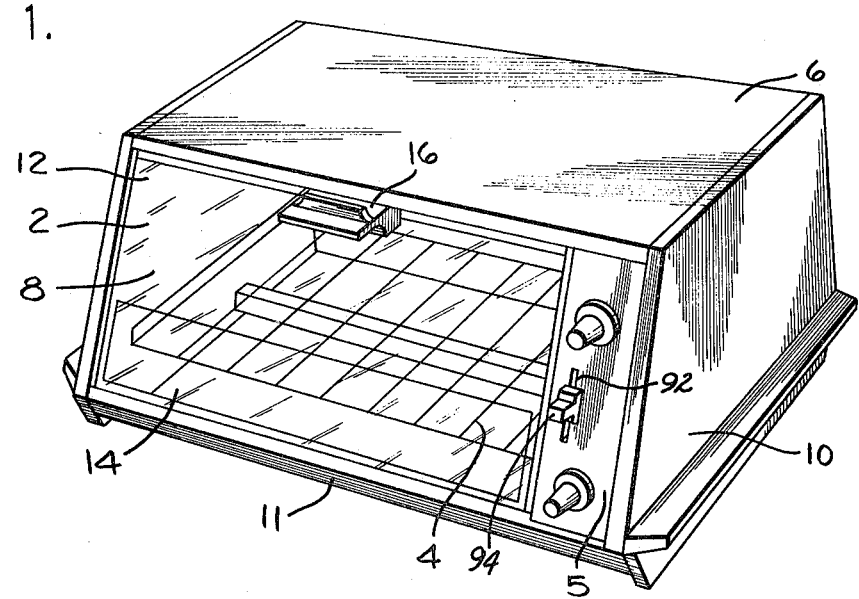
FIG. 1 is a perspective view of an electric oven toaster embodying my improved electric toaster control mechanism.
Figure 2:
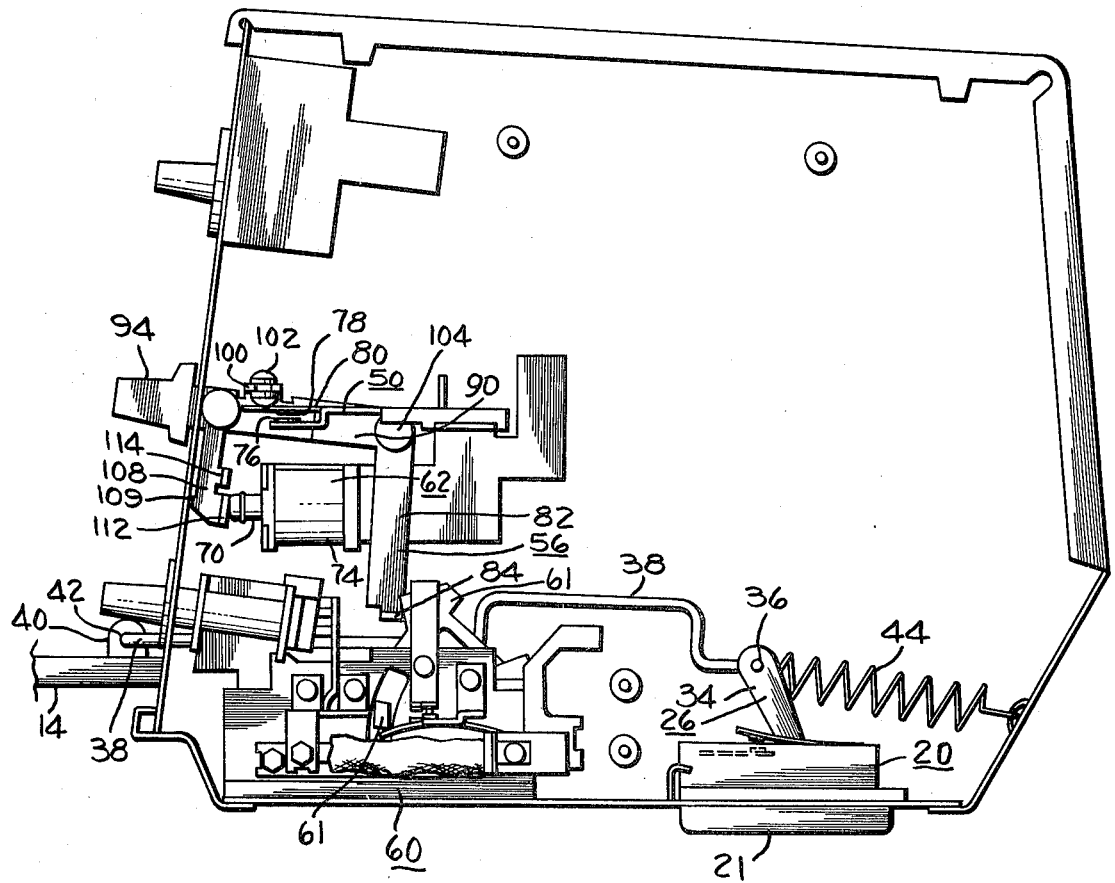
FIG. 2 is a fragmentary side elevational view of a portion of my electric toaster control mechanism illustrating the positions of the parts after the door has been opened at the end of a toasting cycle.

Referring now to the drawing and first particularly to FIGS. 1 and 2, there is shown an electric oven toaster which includes a toasting and oven chamber 2 in which is mounted a generally horizontal rack 4 for holding food to be cooked or bread to be toasted. The oven toaster includes a generally vertical front wall 5, a generally horizontal top wall 6, generally parallel vertical side walls 8 and 10, a bottom wall 11 and a front opening 12 to provide access to the inside of the oven toaster.

A front door 14 is provided for closing the front opening 12. The door is pivotally mounted to the lower portion of the oven toaster, and as shown in FIG. 1, a handle 16 is provided for opening the door.

The front door 14 is linked to a main switch 20 so that movement of the front door in a door opening direction will result in opening the main switch. As shown more particularly in FIGS. 2 and 5, the main switch 20 includes a fixed contact 22 and a movable contact 24. An actuating cam lever 26 is integrally formed with a shaft member 28 which is mounted for rotation on the switch housing 21. The actuating cam lever 26 includes a cam surface 30 that is movable into slidable engagement with the underside of a switchblade 32 for mounting switch contact 24, and an integrally formed upwardly extending actuating arm 34. As shown in FIGS. 2 and 4, an upper portion of the actuating arm 34 is provided with an aperture 36 for receiving one end of a wire actuating rod 38.

As shown in FIGS. 2 and 5, the actuating rod 38 extends from the main switch lever 26 to a tab of 40 which may be formed with the front door 14. As shown in FIG. 2, the rod 38 is inserted through an aperture 42 in the tab 40 in order to pivotally mount the rod to the door tab. A spring 44 is connected to the rod 38 and a rear portion of the oven toaster housing for biasing the rod and the door in a door closing direction.

With this construction, it can be appreciated that when the door is moved to its door open position illustrated in FIG. 5, rod 38 will rotate the cam 30 in a counterclockwise direction to lift switchblade 32 to open switch contacts 24, 22. Conversely, when the door is closed, as illustrated in FIG. 3, for example, the spring 44 will rotate cam 30 to move the high point of the cam from the underside of switchblade 32 to permit the switch contacts 24 and 22 to be closed as illustrated in FIG. 3.

The details of the door operating mechanism and the main switch do not form a part of this invention, and are described and illustrated in greater detail in my co-pending application, Ser. No. 848,789 which is being filed concurrently with the instant application and is assigned to the same assignee as the present invention.

Figure 6:
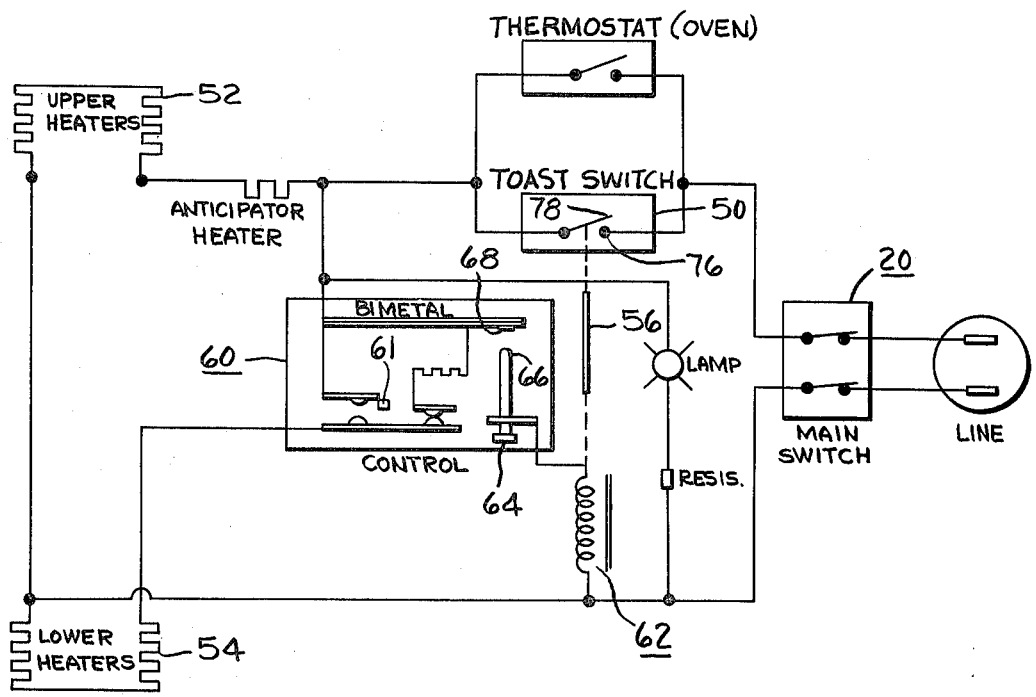
FIG. 6 is a circuit diagram and partial schematic view of portions of the control mechanism for the electric oven toaster illustrated in FIGS. 1–5.

Referring now to the circuit diagram illustrated in FIG. 6, it can be seen that the oven toaster includes a toast switch 50 in series with the main switch 20, and upper and lower heating elements 52 and 54, respectively. Thus, it can be appreciated that both the main switch 20 and the toast switch 50 have to be closed in order to energize the heating elements 52 and 54. The main switch 20 is automatically closed as the door 14 is closed, and my unique manually operable lever 56, to be more fully described hereinafter, is provided for opening and closing the toast switch 50.

HEAT-UP, COOL-DOWN, BI-METAL TIMER

As shown more particularly in FIG. 3 and the circuit diagram illustrated in FIG. 6, a heat-up/cool-down bimetal timer 60 for timing a toasting cycle is mounted at the forward portion of the oven toaster generally below the main switch actuating rod 38. The timer 60 includes a solenoid 62 for releasing my unique manually operated lever 56 at the end of a toasting cycle. While the details of the heat-up/cool-down bi-metal timer do not form a part of my invention and are described and illustrated in greater detail in my prior U.S. Pat. No. 3,529,534, assigned to the same assignee as the present invention, a brief description of the timer is desirable for an understanding of the instant invention. It should be appreciated that the timer 60 is started by rotating its actuator 61 in a clockwise direction from a position illustrated in FIG. 3 to the position illustrated in FIG. 4. This movement starts the heat-up cycle of the heat-up/cool-down bi-metal timer. It should also be appreciated that at the termination of the cool-down cycle of the heat-up/cool-down bi-metal timer switch contacts 66 and 68 are closed to thereby energize solenoid 62 to release my improved manually operable lever 56 from the solenoid 62.

LEVER CONTROL MECHANISM

In accordance with my invention, a toast switch, a heat-up/cool-down bi-metal timer including its solenoid and the other components of an oven toaster control are constructed and arranged so that a single unique manually operable lever 56 may operate the control mechanism. As shown more particularly in FIG. 2, the heat-up/cool-down bi-metal timer 60 is positioned at the lower front portion of the oven toaster and its solenoid 62 is positioned above the main portion of the heat-up/cool-down bi-metal timer with its armature 70 extending forwardly. A solenoid spring 72 normally urges the generally horizontal armature 70 outwardly from a solenoid coil 74.

The toast start switch 50 for energizing the heating elements 52 and 54 after the door 14 has been closed is positioned directly above the solenoid 62. As shown more particularly in FIG. 2, the start switch includes a fixed contact 76 and a movable contact 78 that is mounted on an upwardly biased switchblade 80. Thus, the contacts 76 and 78 are normally held out of engagement with each other.

Figure 7:
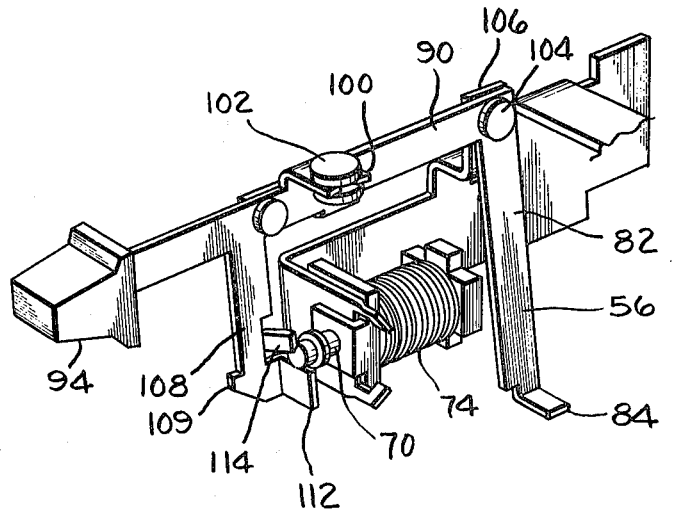
FIG. 7 is an enlarged fragmentary exploded perspective view of portions of my unique lever and solenoid armature construction.

The single manually operable lever 56 that is positioned between the toast timer 60 and the start switch 50 will now be more particularly described. As shown in FIG. 7, the lever is shaped generally in the form of an inverted L and it includes a downwardly extending generally vertical leg 82 for rotating the heat-up/cool-down bi-metal timer actuator 61 from its off position illustrated in FIG. 3 to its on position illustrated in FIG. 4. Thus, the downwardly extending leg 82 includes a generally horizontal lower tab 84 for smooth operating contact with the actuator 61.

The other manually operable leg 90 of the inverted L-shaped lever 56 extends forwardly through a slot 92 that may be formed in the front wall 5 of the oven toaster. As shown in FIG. 3, a knob 94 may be attached to the outer end portion of the horizontal leg 90 of the lever for enabling the lever to be conveniently operated. The generally horizontal leg 90 of the operating lever 56 includes a toast switch operating arm 100 that extends transversely from the horizontal arm 90 to a position directly above switchblade 80. As shown more particularly in FIG. 2, the outer end of lever 100 may be forked for receiving an insulator button 102 in order to suitably insulate the switchblade 80 from the operating lever 56.

The lever 56 is pivotally mounted at the intersection of its legs 82 and 90 by a pivot 104 that extends through an aperture in the lever. As shown more particularly in FIG. 7, the pivot 104 is connected to a tab 106 that is fixed to an inside wall of the oven toaster. Thus, the lever 56 may be readily operated by simply moving the knob 94. It can be appreciated that downward motion of the knob 94 will cause the generally horizontal leg 90 of the lever to be moved downwardly to close switch contacts 76 and 78. During this movement, the generally vertical leg 82 of the manually operable lever 56, and particularly, its lower tab 84 will be moved rearwardly to move actuator 61 from its off position illustrated in FIG. 3 to its on position illustrated in FIG. 4.

In accordance with my invention, the manually operable lever 56 includes a latch arm 108 for holding the lever 56 in a toast switch closed position during a toasting cycle. As shown more particularly in FIG. 4, the latch lever 108 extends generally downwardly and a rivet 110 or other suitable securing means may be used for fixing the latch arm 108 to the generally horizontal arm 90 of the control lever 56. The lower portion of the latch arm 108 includes a generally transverse flat tab 112 for smooth contact with the end portion of the solenoid armature 70. Another transverse tab 114 is integrally formed with the latch arm 108 and is located a short distance upwardly and to the left of the tab 112 as shown in FIG. 4.

The left end portion of the armature 70 of the solenoid is shaped for latching engagement with the tabs 112, 114. As shown in FIG. 4, when the lever 56 is moved downwardly to its latched position during a toasting cycle, the lower portion of the generally cylindrical armature 70 is moved into engagement with the upper surface of tab 112 and the left surface of the armature 70 is in engagement with the right surface of tab 114.

In this position, the spring bias of switchblade 80 urges tab 112 upwardly into contact with armature 70 and the armature spring 72 holds the armature outwardly so that the latch arm 108 and the lever 56 will be held in the position illustrated in FIG. 4 during the toasting cycle. Nevertheless, in the FIG. 4 position, it can be appreciated that the lever 56 is pivoted to the toaster so that its generally horizontal leg is inclined slightly downwardly and the latch arm 108 is inclined slightly to the right from a vertical position and thus, upon manual movement of the knob 94 from the position illustrated in FIG. 4 upwardly to the position illustrated in FIG. 3, the latch arm 108 will be moved forwardly to release the latch arm 108 from the solenoid armature 70. Accordingly, with this construction, whenever it is desired to interrupt the toaster heating elements without opening the oven toaster door, it is merely necessary to lift the knob 94 to release the latch 108 from the solenoid armature 70. During such movement, the upper surface of the tab 112 slides on the lower surface of armature 70 and the unlatching movement is completed as the right side surface of the tab 112 slides on the left side surface of the armature 70 and the switchblade 80 of the toast switch assists movement of the lever 56 to its off position illustrated in FIG. 3.

As shown more particularly in FIG. 2, the lower portion of the latch arm 108 may be formed to include a forwardly extending stop 109 for engagement with the inside surface of a front wall of the oven toaster for restricting movement of the latch arm and the manually operable lever under the force of the spring bias of said switch means.

OPERATION

In operation, slices of bread or other food may be placed on rack 4 and the door 14 is closed. During this operation, the rod 38 which is connected to the door closes the main switch 20. Then the heat-up/cool-down bi-metal timer is started and the toast switch 50 is closed by simply depressing the knob 94 on my unique manually operable lever 56. It can be appreciated that movement of the knob 94 downwardly moves arm 100 and insulator button 102 downwardly to close the toast switch contacts 76 and 78, and this same movement, moves the generally vertical leg 82 rearwardly to move the heat-up/cool-down bi-metal timer actuator from its off position illustrated in FIG. 3 to its on position illustrated in FIG. 4. During this movement, the latch arm 108 of the lever 56 is also moved downwardly to slide the tab 112 on the armature 70 until the tab 112 is moved below the armature. Upon release of the knob 94, the switchblade 80 will move the latch arm 108 a short distance upwardly but further movement will be prevented by the latching engagement of the upper surface of tab 112 with the lower surface of the solenoid armature 70. Now with particular reference to the circuit diagram illustrated in FIG. 6, it can be appreciated that the heat-up/cool-down bi-metal timer will function to heat its bi-metal 71. After the bi-metal has been heated, it cools down, and switch contacts 66 and 68 are closed to energize solenoid 62. When the solenoid is energized its armature 70 will be pulled to the right as shown in FIG. 2 against the force of the solenoid spring 72 and the solenoid armature will move inwardly far enough to release the latch arm 108. With the latch released the switchblade 80 moves the horizontal leg 90 of the lever 56 upwardly from the position illustrated in FIG. 4 to the position illustrated in FIG. 3 to open the toast switch 76, 78 to de-energize the heating elements 52 and 54.

From the foregoing description, it will be appreciated that my improved simplified mechanism for controlling operation of an oven toaster has been achieved with relatively few parts. A single, manually operable lever 56 is positioned between an oven toaster start switch 50 and an oven toaster timer or controller 60. One leg of the lever 82 starts the operation of the toast timer 60 while the other leg 90 of the lever extends outwardly from the oven toaster to a position where it may be manually operated, leg 90 includes an arm 108 for latching the lever to a solenoid armature 70 and an arm 100 for closing the toast switch 76, 78. Thus, an exceedingly simple and reliable mechanism is achieved with the use of relatively few parts.

What I claim is:

1. In an electric oven toaster wherein electric heating means supplies heat to a toasting chamber, switch means is provided for energizing and de-energizing the electric heating means, and a toasting period controller is provided for opening the switch means to de-energize the heating means at the end of a toasting cycle the improvement comprising:
   a. a manually operable lever positioned between said switch means and said toasting period controller for manually closing the switch means and starting the operation of the toasting period controller;
   b. said toasting period controller including a solenoid arranged to be actuated at the end of a toasting cycle;
   c. said solenoid including a solenoid coil and a movable armature member;
   d. said switch means being spring biased to an open position and said lever including a latch arm which is movable into engagement with the armature member of said solenoid for holding the lever and said switch in a closed position against the spring bias of said switch; and
   e. said toasting period controller including means for actuating said solenoid at the end of the toasting cycle to move said armature to release said latch arm from said armature at the end of a toasting cycle to permit the switch to be opened under the force of its spring bias and to move the lever to an off position.

2. An electric toaster construction as defined in claim 1 wherein said toasting period controller is a heat-up/cool-down bi-metal timer and the latch arm includes a generally transverse tab for engaging a lower surface of said movable armature so that at the end of the cool-down cycle of said heat-up/cool-down bi-metal timer the solenoid armature is moved away from said tab to release the latch arm of the manually operable lever to permit the switch to be opened under the force of its spring bias and to move the lever to an off position.

3. An electric toaster construction as defined in claim 1 wherein said manually operable lever includes a generally transverse arm positioned above said switch means, said switch means includes an upwardly biased blade and the transverse arm includes an insulator button for contact with said switchblade so that said manually operable lever is insulated from said switchblade when it moves the switchblade to its on position to close the switch contacts.

4. An electric oven toaster construction as defined in claim 1 wherein said manually operable lever is formed generally in the shape of an inverted L having two legs and is mounted to the oven toaster at the intersection of its legs, one of the legs being generally horizontal and extending outwardly from the oven toaster to a position where it may be manually operated and the other leg extending downwardly for actuating the toasting period controller.

5. An electric oven toaster construction as defined in claim 1 wherein said latch arm includes a forwardly extending stop for engagement with the inside surface of a front wall of the oven toaster for restricting movement of the latch arm and the manually operable lever under the force of the spring bias of said switch means.

6. In an electric oven toaster wherein heating means supplies heat to a toasting chamber, switch means is provided for energizing and de-energizing the electric heating means, and a toasting period controller is provided for opening the switch means to de-energize the heating means at the end of a toasting cycle the improvement comprising:
   a. a heat-up/cool-down bi-metal timer positioned at a lower forward portion of said oven toaster and having a rotatable actuator extending upwardly;
   b. said heat-up/cool-down bi-metal timer including a solenoid having an armature which is actuated at the end of a toasting cycle, said armature being generally cylindrical and extending forwardly from a coil portion of said solenoid in a generally horizontal direction;
   c. said switch means being positioned at a forward portion of said oven toaster above said solenoid, the switch including a lower fixed contact and an upwardly biased switchblade having a movable contact that may be moved into engagement with the fixed contact against the bias of said switchblade;
   d. an inverted L-shaped lever having two legs and being pivoted to the oven toaster at the intersection of its legs, one of its legs extending generally vertically downwardly for engagement with the actuator of said heat-up/cool-down bi-metal timer and the other leg extending generally horizontally forwardly and outwardly from the oven toaster to a position where it may be manually actuated;
   e. said generally horizontal leg including means in engagement with an upper surface of said switchblade for moving said switchblade downwardly to close said switch contacts to energize the heating elements at the commencement of a toasting cycle;
   f. a latch arm fixed to the generally horizontal leg of said inverted L-shaped lever extending downwardly for latching engagement with the generally cylindrical armature of said solenoid; and
   g. said heat-up/cool-down bi-metal timer including means for actuating said solenoid at the end of the toasting cycle to move said armature to release said latch arm from said armature to permit the switch to be opened under the force of its spring bias and to move the lever to an off position.

* * * * *